April 19, 1932.　　　F. F. BRAND　　　1,854,975
TRANSFORMER
Filed Oct. 26, 1931
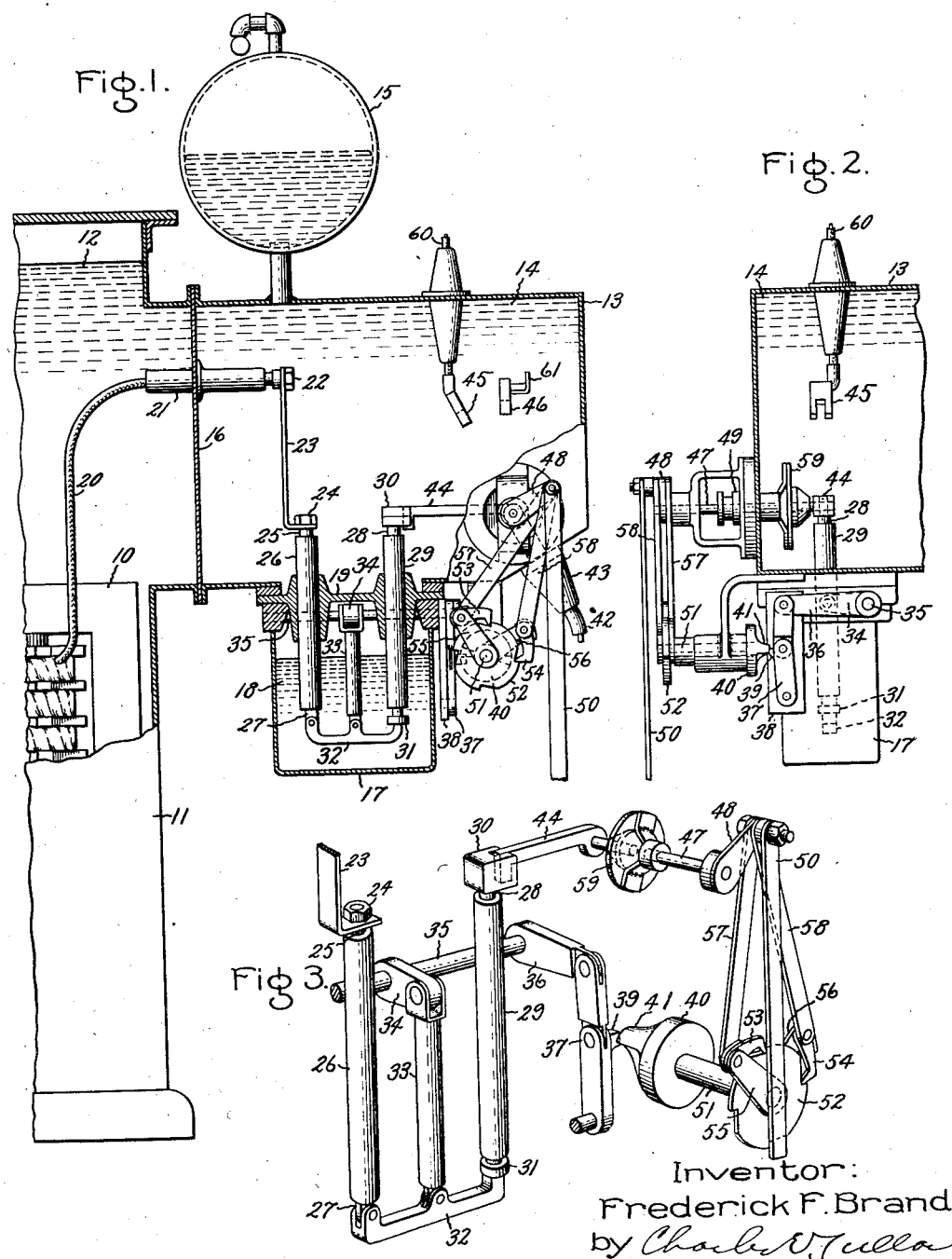
Inventor:
Frederick F. Brand,
by Charles N. Tulla
His Attorney.

Patented Apr. 19, 1932

1,854,975

UNITED STATES PATENT OFFICE

FREDERICK F. BRAND, OF PITTSFIELD, MASSACHUSETTS, ASSIGNOR TO GENERAL ELECTRIC COMPANY, A CORPORATION OF NEW YORK

TRANSFORMER

Application filed October 26, 1931. Serial No. 571,026.

My invention relates to transformers. A high voltage cable for power transmission is sometimes connected to a transformer by a switch arranged in a junction box which is mounted on the casing of the transformer. The purpose of the switch is to disconnect the cable from the transformer so that inspection, repairs and tests of the cable may be made. In many cases, these switches have several positions and are arranged so that the cable may be merely disconnected from the transformer, switched to an outside terminal to permit insulation tests of the cable to be made, or connected to ground for safety when work is being done on the cable. Before operating such a switch and to prevent injury to it, the load on the transformer is usually interrupted by a suitable switch or circuit breaker in the primary. The transformer may still be excited, however, through the high voltage cable where the transformer is interconnected in the same power transmission system with other transformers. The general object of the present invention is to provide a cable disconnecting switch for a transformer with an improved arrangement for protecting this switch from injury from possible transformer exciting or magnetizing current.

The invention will be better understood from the following description taken in connection with the accompanying drawings in which Fig. 1 is a front view of a transformer connected to a high voltage cable through junction box switches arranged in accordance with the invention, parts being broken away to show details; Fig. 2 is a side view of the junction box and switch mechanism, partly broken away to show details; and Fig. 3 is a somewhat diagrammatic perspective view of the switch mechanism.

Like reference characters indicate similar parts in the different figures of the drawings.

The transformer 10 shown in Fig. 1 of the drawings is enclosed in a casing 11 containing an insulating liquid 12 in which the transformer is immersed. A junction box 13 is mounted on one side of the transformer casing 11 and is filled with insulating liquid 14 which extends into an expansion chamber 15 to permit thermal expansion and contraction of the liquid. The liquid 12 in the casing 11 and the liquid 14 in the junction box 13 are separated by a partition 16 between the casing and junction box. A switch or circuit breaker box 17 is mounted on the junction box 13, the switch box 17 preferably depending from the bottom or floor of the junction box. The switch box 17 is partially filled with insulating liquid 18 and is separated from the liquid 14 in the junction box by a partition 19.

A high voltage lead 20 from the transformer 10 extends through the partition 16 in a bushing 21 to a terminal 22 in the junction box 13. This terminal 22 is joined by a connector 23 to a terminal 24 of a switch rod 25 which extends through the partition 19 in a bushing 26 to a terminal 27 in the switch box 17. Another switch rod 28 extends through the partition 19 in a bushing 29 and has a contact 30 at its upper end in the junction box 13 and a contact 31 at its lower end in the switch box 17. The circuit through the two switch rods 25 and 28 may be closed and opened by a switch arm 32 pivoted at one end to the terminal 27 and controlled by a rod 33 connecting it to the outer end of a lever 34 projecting from a rotatable shaft 35.

One end of the shaft 35 extends through one side of the switch box 17 and is provided with a lever 36 connected at its outer end with one end of a toggle 37. The other end of the toggle 37 is pivoted to a fixed bracket 38. A stop 39 on the toggle 37 bears against a face cam 40 which thus controls the position of the switch arm 32 through the toggle 37. The cam 40 has a narrow ridge 41 extending diametrically across its face which falls away sharply on both sides of the ridge to its base. The toggle 37 and its stop 39 are displaced from the axis of the cam 40 so that the stop 39 is opposite the edge of the face of the cam, the stop being held against the face of the cam by the action of gravity on the levers 34 and 36 and the switch rod 33 and switch arm 32. Thus, the toggle will be straightened and bent and the switch arm 32 will be opened and closed with its contact 31 twice during each revolution of the cam 40.

A lead cable 42 extends through a bushing 43 into the junction box 13 to a terminal to which is pivoted a switch arm 44. The contact 30 and two other contacts 45 and 46 are in the path of the outer end of the switch arm 44 so that the cable 42 may be connected to any one of these contacts. The switch arm 44 is connected by a shaft 47 to a lever 48, the shaft extending through the side of the junction box 13 in a stuffing box 49. The position of the switch arm 44 is controlled by an operating rod 50 pivoted to the outer end of the lever 48 and actuated in any desired manner.

The cam 40 is secured to one end of a shaft 51 with a notched disk 52 secured to the other end. Two spring pressed latches 53 and 54 engage the notches in the disk 52 and are carried by arms 55 and 56 respectively pivoted at their inner ends on the shaft 51. The outer ends of the arms 55 and 56 are connected to the outer end of the lever 48 by connecting links 57 and 58 respectively.

Both switches which have been described are controlled by the operating rod 50. In the positions shown in the drawings, both switches are closed to connect the cable 42 to the transformer 10. The shaft 47 is formed in two sections connected by a coupling including an insulating disk 59 to insulate the switch arm 44 from the switch operating mechanism. If the rod 50 is pulled down, the shaft 47 will move the switch arm 44 into open position. The same motion of the rod 50 moves the latches 53 and 54 in opposite directions around the shaft 51. The latch 53 merely slides along the edge of the disk 52 but the latch 54 engages a notch in this disk and rotates the shaft with the cam 40. A slight motion of the cam 40 releases the toggle 37 and permits the switch arm 32 to drop to open position before the other switch arm 44 has left its contact 30. Thus, if any current is flowing through the switches, the quick acting switch arm 32 breaks the circuit first and prevents any arcing and consequent injury at the other switch arm 44 or its contact 30 as they separate. If the rod 50 is pulled further down, the switch arm may be moved to connect the cable 42 with the contact 45 and finally with the contact 46. The contact 45 is connected to a conductor 60 extending outside the junction box to permit insulation tests of the cable to be conveniently made. The contact 46 is connected by its bracket 61 to ground through the junction box to which the bracket is secured. When the cable is connected to this grounded contact, work may be done on the cable without any danger from high voltage in the cable.

The cable 42 may be connected to the transformer 10 again by pushing the rod 50 up. This turns the shaft 40 and moves the switch arm 44 back to the contact 30. At the same time, the arms 55 and 56 with their latches 53 and 54 are turned upwardly in opposite directions about the shaft 51, the latch 54 sliding along the edge of the disk 52 but the latch 53 engaging a notch in the disk and rotating the shaft 51 and the cam 40 to close the contact arm 32 against its contact 31. As indicated most clearly in Fig. 2, the toggle 37 is always biased toward the cam 40 so that the switch arm 32 will open when the toggle is released from its straightened or extended position by the cam. In closing the switch arms 44 and 32 against their contacts, the timing of the operating mechanism is such that the switch arm 44 will close slightly before the switch arm 32. The circuit is thus finally closed by the switch arm 32, and the other switch arm 44 and its contact 30 are protected from injury due to arcing and burning.

The invention has been explained by describing and illustrating a transformer connected to a cable by a particular arrangement of switching apparatus constructed in accordance with the invention but it will be apparent that changes may be made without departing from the spirit of the invention and the scope of the appended claims.

What I claim as new and desire to secure by Letters Patent of the United States, is:

1. The combination with a transformer and a casing for the transformer, of a junction box, a switch in said junction box, an outside conductor connected to said switch, a switch box, a switch in said switch box, said switches being electrically connected together, and an electrical connection extending through said junction box between said transformer and the switch in said switch box.

2. The combination with a transformer and a casing for the transformer, of a junction box, a switch in said junction box, an outside conductor connected to said switch, a switch box, a switch in said switch box, said switches being electrically connected together, an electrical connection extending through said junction box between said transformer and the switch in said switch box, and operating mechanism for opening and closing said switches in predetermined sequence.

3. The combination with a transformer and a casing for the transformer, of a junction box, a switch in said junction box, an outside conductor connected to said switch, a switch box secured to said junction box and containing an insulating liquid, a switch immersed in said liquid, said switches being electrically connected together, a liquid tight partition between said junction box and said switch box, and an electrical connection extending through said junction box between said transformer and the switch in said switch box.

4. The combination with a transformer and a casing for the transformer, of a junction box, a switch in said junction box, an outside conductor connected to said switch, a switch box, a switch in said switch box, said switches being electrically connected together, an electrical connection extending through said junction box between said transformer and the switch in said switch box, means for opening and closing the switch in said junction box, and means controlled by said switch operating means for opening the switch in the switch box before the switch in the junction box opens and for closing the switch in the switch box after the switch in the junction box closes.

5. The combination with a transformer and a casing for the transformer, of a junction box mounted on said transformer casing, a switch in said junction box, an outside conductor connected to said switch, a switch box depending from said junction box and containing an insulating liquid, a switch in said switch box, a liquid tight partition between said junction box and said switch box, said switches being electrically connected together, and an electrical connection extending through said junction box between said transformer and the switch in said switch box.

6. The combination with a transformer and a casing for the transformer, of a junction box mounted on said transformer casing, a switch in said junction box, an outside conductor connected to said switch, a switch box depending from said junction box and containing an insulating liquid, a switch in said switch box, a liquid tight partition between said junction box and said switch box, said switches being electrically connected together, an electrical connection extending through said junction box between said transformer and the switch in said switch box, and operating mechanism for opening and closing said switches in predetermined sequence.

In witness whereof, I have hereunto set my hand.

FREDERICK F. BRAND.